(12) United States Patent
Mauger (10) Patent No.: US 6,522,627 B1
(45) Date of Patent: Feb. 18, 2003

(54) MANAGING INTERNET PROTOCOL CONNECTION ORIENTED SERVICES

(75) Inventor: Roy Harold Mauger, Radlett (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/190,081

(22) Filed: Nov. 12, 1998

(51) Int. Cl.[7] .......................... G01R 31/08; G06F 11/00; H04J 1/16; H04J 3/14; H04L 1/00; H04L 12/26; H04L 12/66

(52) U.S. Cl. ........................................ 370/230; 370/356

(58) Field of Search ................................. 370/351, 389, 370/395.1, 396, 397, 398, 399, 395.5, 395.52, 352, 353, 357, 400, 409, 254, 395.3, 395.31, 229–230, 395.2, 395.21, 356; 709/227, 228, 229, 238

(56) References Cited

U.S. PATENT DOCUMENTS 5,870,386 A * 2/1999 Perlman et al. ............. 370/256
6,094,437 A * 7/2000 Loehndorf et al. .......... 370/420
6,256,309 B1 * 7/2001 Daley et al. ............ 370/395.43
6,304,549 B1 * 10/2001 Srinivasan et al. .......... 370/230
6,333,918 B1 * 12/2001 Hummel ..................... 370/238
6,363,319 B1 * 3/2002 Hsu ........................... 370/238

OTHER PUBLICATIONS

XP–002115225—IETF Multiprotocol Label Switching (MPLS) Architecture. (Francois Le Faucheur).
Evolution of Multiprotocol Label Switching—XP–000752861.
Multiprotocol Label Switching in ATM Networks—XP–000734507.

* cited by examiner

Primary Examiner—Kwang Bin Yao
Assistant Examiner—Kevin C. Harper
(74) Attorney, Agent, or Firm—Lee, Mann, Smith, McWilliams, Sweeney & Ohlson (57) ABSTRACT

In a packet communications network, e.g. an IP network, connection oriented services are carried in user tunnels which are set up in engineering tunnels established across the network. This provides end to end connectivity without the need for individual packet routing at the intermediate network nodes.

6 Claims, 10 Drawing Sheets

MANAGING INTERNET PROTOCOL CONNECTION ORIENTED SERVICES

This invention relates to systems and methods for providing and managing Internet protocol (IP) connection oriented services.

BACKGROUND OF THE INVENTION

The Internet Protocol was initially defined for connectionless services. In a typical IP network, traffic is carried in packets which are individually routed at the system nodes. The services currently provided in such networks normally operate on a best effort basis, i.e. the network will always attempt to route a packet to its destination, but cannot guarantee delivery e.g. under overload conditions There is now a keen interest in the provision of voice services over the Internet where costs are significantly less than those associated with the conventional PSTN. However, the adaptation of what is effectively a high priority connection oriented service to a 'best effort' connectionless or packet system has introduced a number of significant problems. In particular, if an Internet voice service is to obtain universal acceptance, it must provide a quality of service similar to that currently provided by conventional voice networks.

A number of workers are currently addressing this problem. For example, the current Internet Ipv4 protocol includes a TOS octet and Ipv6 a traffic class octet which allows a number of priority levels to be defined to support some degree of traffic engineering in an IP network.

The IETF Differentiated Services Working Group has recently defined a method whereby traffic is classified at a priority level and is policed on entry to an IP network. Traffic behaviour on internal links (per hop behaviour) is specified. It is expected that using these methods then service level agreements can be offered to users provided that the number of internal hops is low and also provided that the percentage of high priority traffic is a small percentage of the total traffic.

Other IETF Working Groups have defined protocols providing some degree of connection orientation. These are:

Multi Protocol Label Switching (MPLS) includes the ability to tunnel through many routing stages and to do so using explicit routing rather than hop-by-hop routing. This is a form of connection orientation.

Layer 2 Tunnelling Protocol (LTP) provides a signalling system to dynamically create and delete IP point to point protocol (PPP) sessions end to end across a tunnel. These sessions are allocated bandwidth, are timed for billing purposes, and are explicitly deleted on completion. This is a fully connection oriented paradigm.

Connection orientation is of particular value in the provision of carrier network services to individual users or to user networks. In particular it simplifies the tasks of:

Guaranteeing bandwidth.

Ensuring Quality of service.

Authenticating end user identities.

Preventing fraudulent access or misuse of resources.

Existing Layer 2 networks such as Frame Relay or ATM are able to provide an effective control framework to provide bandwidth accounting. However their control protocols are not sufficiently integrated into the Layer 3 IP network functionality to ensure that QoS characteristics of user services are maintained. This has limited the exploitation of this characteristic and has thus failed to resolve the provision of QoS in the Internet.

SUMMARY OF THE INVENTION

An object of the invention is to minimise or to overcome the above disadvantage.

A further object of the invention is to provide an improved arrangement and method for providing connection oriented services in a connectionless network.

According to the invention there is provided a method of carrying connection oriented services over a connectionless network, the method comprising establishing engineering tunnels in the connectionless network establishing user tunnels within the engineering tunnels, and transporting said connection oriented services via said user tunnels.

According to a further aspect of the invention there is provided A connectionless network arrangement for switching connection oriented services, the arrangement comprising means for establishing engineering tunnels in the connectionless network, means for establishing user tunnels within the engineering tunnels, and means for transporting said connection oriented services via said user tunnels.

Advantageously, management of the connection oriented services is performed by the transmission of signalling information via the engineering tunnels.

In a further aspect the invention provides a network node router for switching connection oriented services and non-connection oriented services over a connectionless packet network comprising a plurality of nodes and provided with tunnels within which tunnels the connection oriented services are carried, the router comprising an inner switch core arranged to handle packet traffic that is routed from node to node and not contained within a said tunnel and incorporating a set of ingress functions coupled to respective ingress ports, and a set of egress functions coupled to respective egress ports, and wherein the router further incorporates means for identifying traffic contained within a said tunnel so as to permit that traffic to pass directly through the node.

In yet another aspect, the invention provides a method of packet switching at a network node connection oriented services and non-connection oriented services over a connectionless packet network provided with tunnels within which the connection oriented services are carried, the method comprising determining at said network node whether a packet received at said node is or is not contained within a said tunnel, determining for each said packet not contained within a tunnel an adjacent node to which to route that packet, and permitting packets determined to be contained within a said tunnel to pass through the node within that tunnel.

The invention further comprises a connection control architecture to provide a range of connection oriented services in Internet Protocol networks. The architecture, which applies recursively at multiple levels, can be used to establish engineering tunnels in the physical network and user tunnels within these engineering tunnels.

The invention further relates to an architecture for the systematic provision of connection oriented services with managed bandwidth, guaranteed Quality of Service and user authentication. In the prior art such capabilities are provided by a separate network such as Frame Relay or ATM, such networks operate at Layer 2 leaving the Internet work to operate at Layer 3. In this invention a single network operates at Layer 2 or Layer 3 interchangeably according to the function required.

In a preferred embodiment, the network comprises a hierarchy of sub-networks. Within each sub-network, each node has a first database of topology information relating to that sub-network, and a second database of summary information relating to other sub-networks. One node in each sub-network is defined as a peer group leader for that sub-network, and distributes the summary information to the other nodes of that sub-network

BRIEF DESCRIPTION OF THE DRAWINGS

A preferred embodiment of the invention will now be described with reference to the accompanying drawings in which:

FIG. 3a illustrates a messaging protocol used in the setting up of the PPP session of FIG. 3;

DESCRIPTION OF PREFERRED EMBODIMENTS

Reference will first be made to FIGS. 1 to 3a which are introduced for comparative and explanatory purposes, and for the purpose of facilitating an understanding of the invention.

Figure 1:
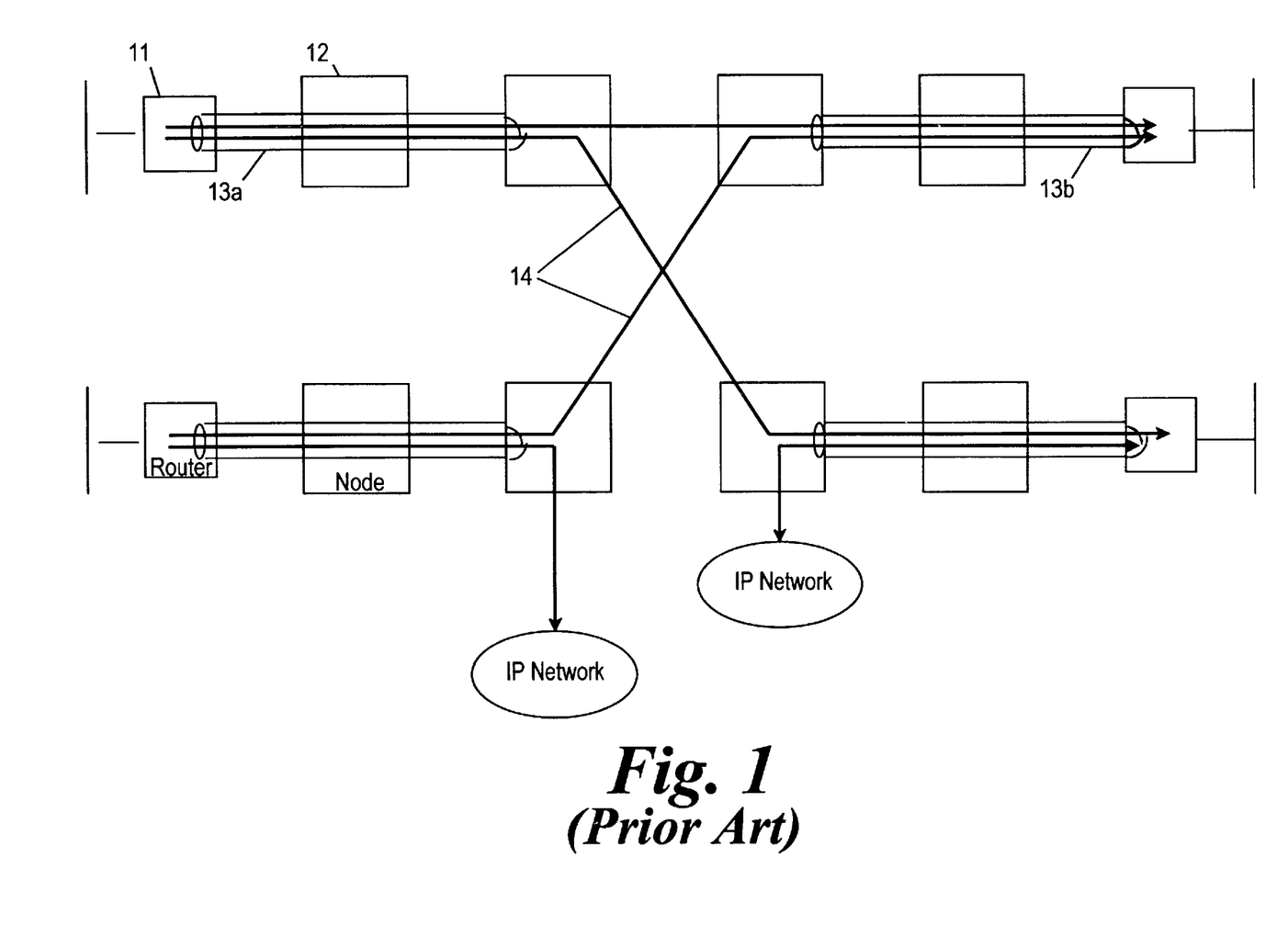
FIG. 1, illustrates the MPLS mechanisms for tunnelling and explicit routing.

Referring to FIG. 1, which is introduced for explanatory and comparative purposes, this shows a prior art MPLS network. The network comprises a number of MPLS edge routers 11 and MPLS switching nodes 12. Such a network allows tunnels to be defined and used for explicit end to end routing of packets. Packet traffic contained within a tunnel passing through a switching node is effectively ignored by that node as far as routing is concerned. The tunnels can be defined at several layers, and tunnels of one layer can be carried within tunnels of other layers. For the purpose of illustration, engineering tunnels 13a, 13b etc. are defined for an engineering layer which is used to divide up capacity in the physical network, and user tunnels 14, which utilise capacity of the engineering tunnels, are defined in order to provide end user services. An engineering tunnel may of course accommodate a number of user tunnels, and a user tunnel will, in general, pass through more than one engineering tunnel. As shown in FIG. 1, the user tunnel 14 is contained in the engineering tunnels 13a and 13b. A typical end user service would be a guaranteed bandwidth service between two VPN user nodes.

In the network of FIG. 1, an engineering tunnel is a permanent or semi-permanent entity that is set up across a number of network nodes, but which does not in general provide a complete end to end route across the network. A user tunnel is a temporary entity that is set up within an appropriate number of engineering tunnels to provide end to end connectivity for the duration of a network transaction, and which is torn down when that transaction has been completed. The purpose of a tunnel is to facilitate routing of packets. A packet within a tunnel can pass through a node without that node needing to have any knowledge of the destination of that packet, nor even of the next node at which the packet will arrive, as the packet can remain within the tunnel until emerging at its final destination. The only information required by the node is the identity of the tunnel via which the packet is transported. It will be understood that an IP network incorporating the tunnel concept may carry both tunnelled packet traffic and conventional packet traffic that is routed at each system node through which it passes.

Figure 2:
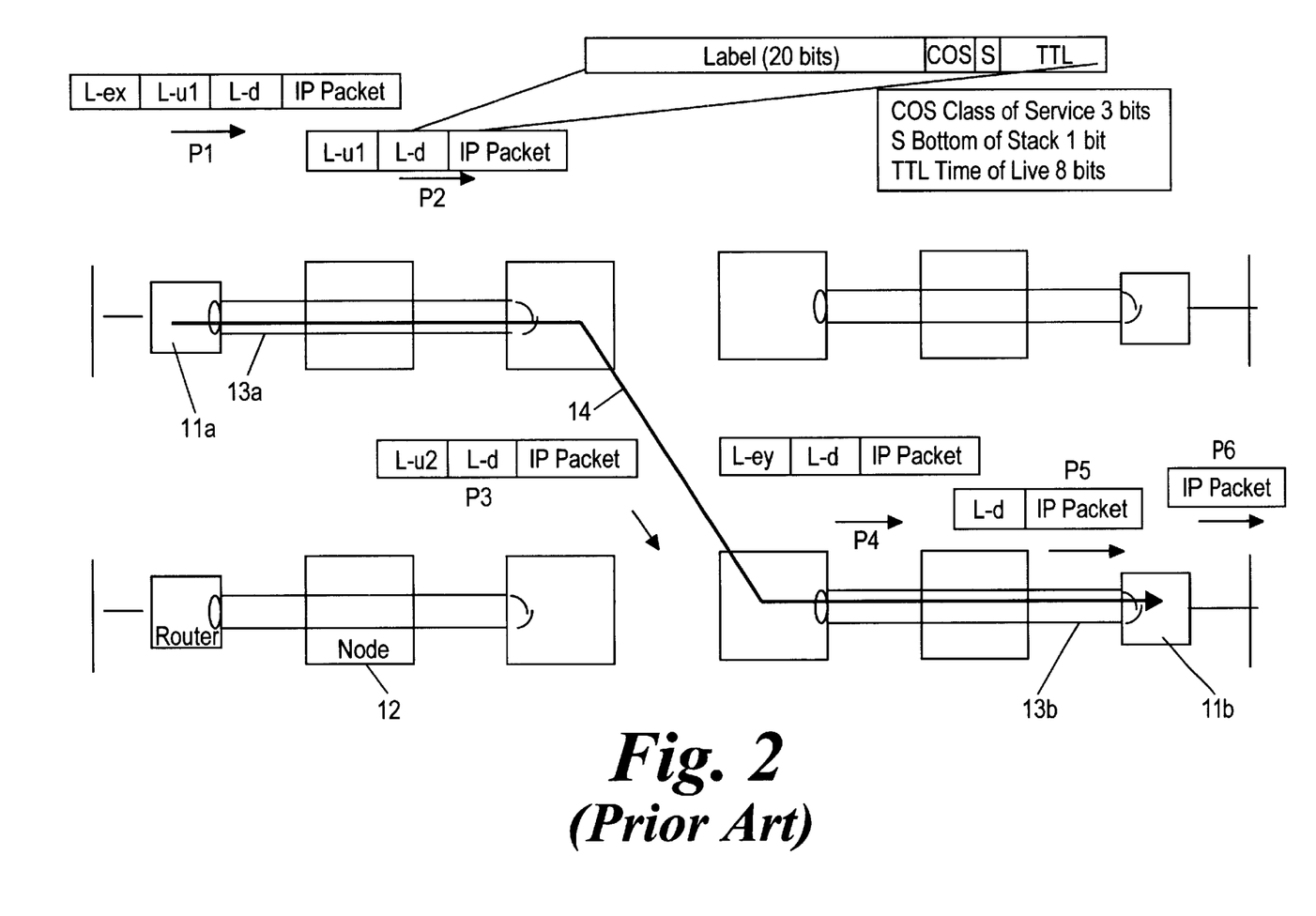
FIG. 2 illustrates the MPLS label processing functions performed in routing a packet through an example connection oriented tunnel of FIG. 1.

The multi protocol label switching (MPLS) operation of the network of FIG. 1 is depicted in FIG. 2 which illustrates the typical packet format P1-P6 at each of the stages in the routing of an IP packet payload end to end across the network of FIG. 1. A typical MPLS packet comprises the original IP packet together with a stack of labels which are used by the MPLS nodes 12 through which the packet passes to control the onward routing of the packet. At each node, the current packet label is used to determine the onward routing of the packet, i.e. the tunnel to which the packet is allocated. The labels are typically each of 4 bytes length comprising a 20 bit label value, a 3 bit class of service field, used to maintain QoS differentiation, a 1 bit "bottom of stack" indicator and an 8 bit "time to live" field, which is used to detect packet forwarding loops.

The packet formats P1–P6 are selected in order to achieve explicit forwarding of the packet over a user tunnel which is itself contained within first and second engineering tunnels in order to reach the destination edge router. MPLS is designed such that it is possible, at each node, to forward the packet based on the label at the top of the stack.

As shown in FIG. 2, the packet format P1 has labels L-d, L-u1, and L-ex. The label L-d is significant to the destination edge router 11b and is a label exchanged by the label distribution protocol over the user tunnel. L-u1 is the first label of a series used for the user tunnel and is exchanged over the first engineering tunnel 13a. L-ex is a label for the engineering tunnel 13a.

The packet format P2 is used by the first node 12 to determine that this is the penultimate node for the first engineering tunnel 13a. This leads to a "pop" of the stack so that the labels L-d and L-u1 are forwarded to the next node. It will be understood that the term "popping" of a label stack refers to the removal of the label currently at the head of the stack, and that the term "pushing" of a label refers to the addition of a label to the stack.

The label L-u1 of the packet format P3 is used to forward the packet and is translated to the label L-u2 for the next hop.

The label L-u2 of the packet format P4 is used for forwarding. It is determined that this is the penultimate hop from the perspective of the user tunnel so label L-u2 is popped. It is also determined that the second engineering tunnel 13b is used, L-ey being a label for the engineering tunnel 13b. The packet is therefore forwarded with the labels L-d and L-ey.

At the penultimate node of the second engineering tunnel 13b, the label L-ey of the packet format P5 is popped so the packet arrives at the destination edge router 11b with the label L-d only.

At the destination edge router 11b, the original IP packet (format P6) is forwarded to the final destination on the Lan.

Figure 3:
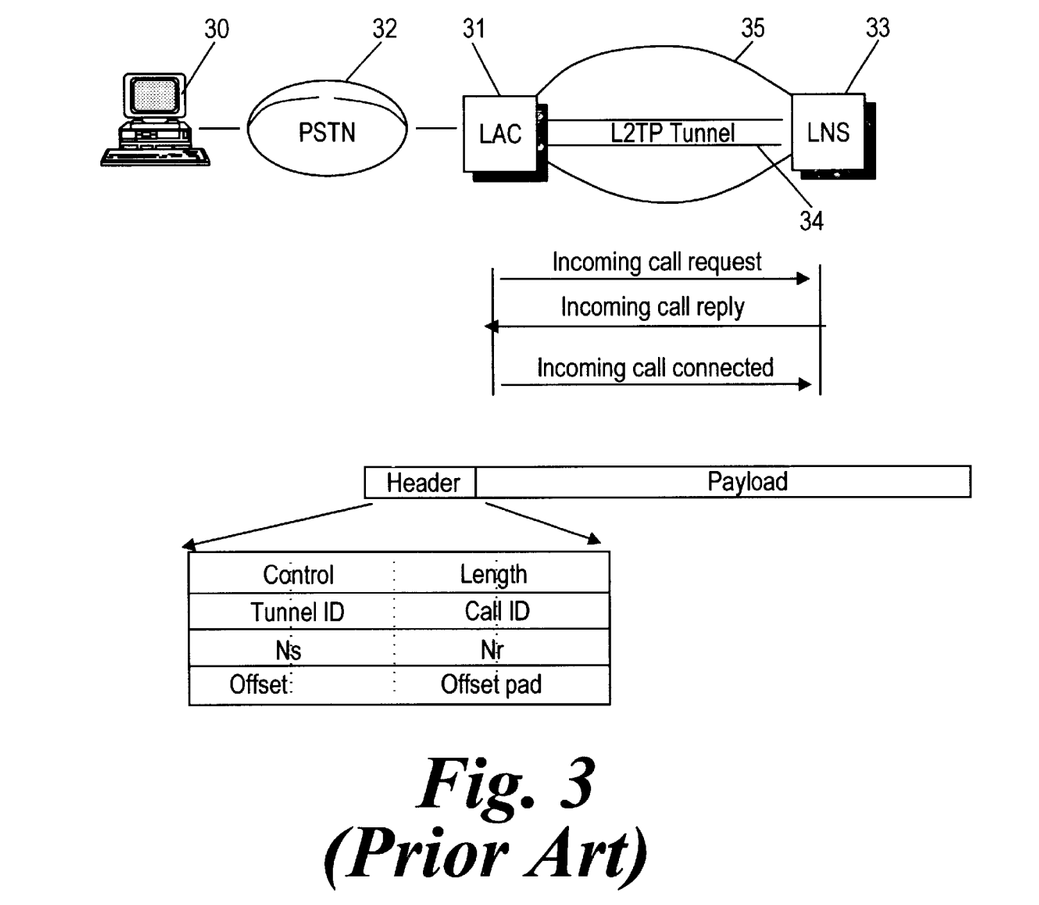
FIG. 3 illustrates the establishment of an IP (PPP) session in an L2TP tunnel.

A further example of tunnelling prior art, illustrated for explanatory and comparative purposes in FIGS. 3 and 3a, is the layer 2 tunnelling Protocol (L2TP). L2TP is used for dial-up services where the point of network service is different from the point at which the original dialup call is made. An example is Internet service provider (ISP) roaming whereby the dialup is terminated at the nearest ISP but the network service is provided by the original or home ISP. L2TP provides a connection signalling mechanism so that point to point protocol (PPP) sessions can be dynamically multiplexed within the tunnel. PPP payload packets have a short header prepended thereto so that the original PPP packets can be identified and forwarded as appropriate.

FIG. 3 further illustrates a new call from a user terminal 30 arriving at a L2TP access concentrator (LAC) 31 from a dial-up modem connection set up via a PSTN 32. The associated messaging is illustrated in FIG. 3a. It is determined that the call is destined for a remote L2TP network server (LNS) 33 coupled to IP network 35. A user tunnel 34 is thus established across the IP network between the concentrator 31 and the remote server 33. An exchange of messages within the L2TP tunnel 34 leads to an allocation of a call ID within the tunnel 34 which can be used to identify packets in both directions related to this call.

Having described the prior art network operation in order to facilitate a fuller understanding of the invention, preferred embodiments of the invention will now be described by way of example with reference to FIGS. 4 to 9 of the accompanying drawings.

Figure 4:
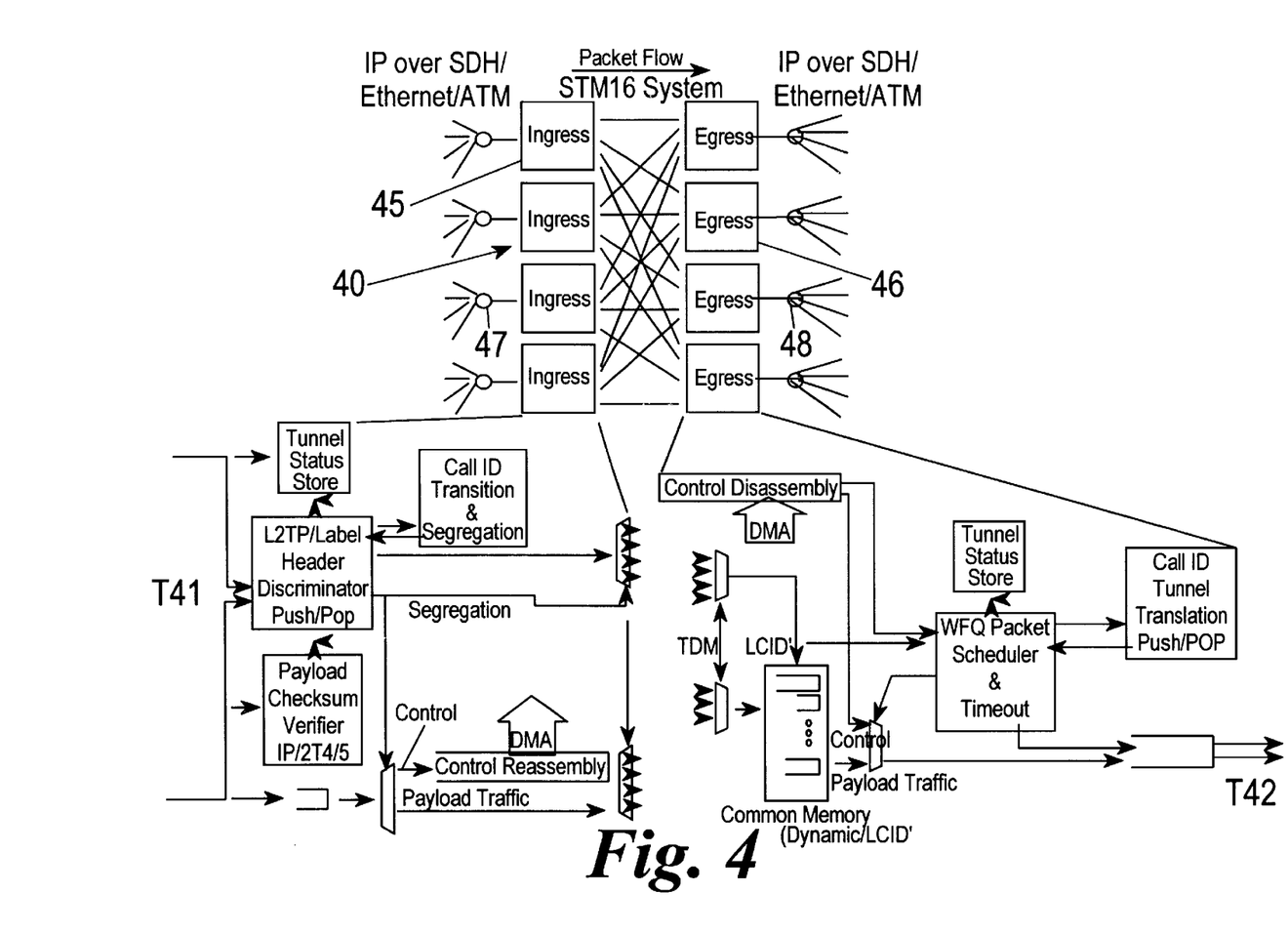
FIG. 4 illustrates a hardware fabric employed in a preferred embodiment of the invention and which is arranged to operate as a Layer 3 MPLS Router, a Layer 2 MPLS tunnel switch and a Layer 2 IP (PPP) session switch.

Referring first to FIG. 4, this depicts the inner core and the surrounding circuitry of a router or switch according to a preferred embodiment of the invention. As shown in FIG. 4, the switch incorporates an inner core 40 comprising a set of ingress functions 45 coupled to respective ingress ports 47, and a set of egress functions 46 coupled to respective egress ports 48. Any ingress function can route a received packet to any egress function. The ingress and egress ports coupled to the respective ingress and egress functions handle packet traffic that is routed from node to node, i.e. not contained within a tunnel. Tunnel based traffic is received e.g. from tunnel T41 which either terminates at or passes through the node. The tunnel T41 may be an engineering tunnel accommodating a number of user tunnels.

The lower half of FIG. 4 shows a decomposition of the ingress and egress functions. A Tunnel Status store provides an identification of whether the tunnel type is MPLS or L2TP and also the maintenance status of the tunnel. This is used by the L2TP/Label Header Discriminator to access the header information and to execute any required Push/Pop operation. The header information is used to access the Call Id Translation & segregation function in order to identify the required egress function and to modify the L2TP headers for onward transmission. The packet is then forwarded on a link to the required egress function. In the typical switch fabrics e.g. ATM, the packet will have been segmented for transport purposes, in this case the packet is reassembled in the egress function for egress control purposes, the header of the packet as modified by the ingress function provides all the control information required for egress. The Tunnel Status store discriminates between MPLS and L2TP operation. The header can be further processed by additional push/pop operations or by Tunnel id/Call id translations. The packet is then passed to the scheduler for transmission, this includes a Weighted Fair Queuing function in order to maintain a fair discard operation in the event of overload.

In the arrangement of FIG. 4, IP packets that are received at the switch from tunnel T41 are output into tunnel T42. If the IP packets are already in MPLS format then they are directly forwarded to the inner core 41 of the switch. For IP packets which are in their normal format, an additional function, not shown, is required to process the IP address and establish an MPLS label according to the forwarding equivalence class, i.e. the set of IP addresses which share a common MPLS label. The provision of such a function will be understood by those skilled in the art. A switch on a single card is typically made up, as illustrated in FIG. 4, from four VLSI components, each of which provides 622 MB/s of switching capacity. Each VLSI component comprises an ingress function 45 and an egress function 46. The ingress function 45 processes the initial MPLS label. For normal MPLS packets, a treatment indicator determines whether to PUSH/POP the label stack and/or translate the label. Where the initial MPLS label indicates that an L2TP tunnel is contained within the label, then a second pass is performed interpreting the second header as an L2TP header with its own treatment indicator. The initial ingress function 45 selects an egress port 48 for forwarding. The packet is segmented by the ingress port 44 and forwarded typically as 64 byte segments to the egress port. The egress port reassembles the packet and has an additional treatment indicator, which it uses to prepend the final headers and labels before forwarding the packet on to the next switching node.

Figure 5:
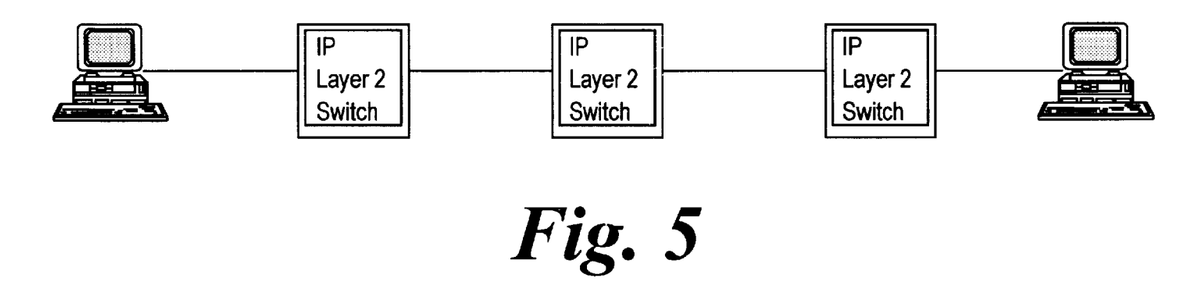
FIG. 5 illustrates in schematic a general connection oriented IP network according to a preferred embodiment of invention.

The switch architecture of FIG. 4 embodies a connection control architecture which provides a range of connection oriented services in Internet Protocol networks. This architecture, which applies recursively at multiple levels, can be used to establish engineering tunnels in the physical network and user tunnels within these engineering tunnels. The architecture can also be used to establish PPP Sessions within a succession of L2TP tunnels. The L2TP tunnels can be mapped onto MPLS tunnels, and the MPLS tunnels can hide details of the IP network topology from the L2TP layer network. An exemplary relationship between L2TP tunnels and MPLS tunnels is illustrated in FIGS. 5 to 5c. In prior art systems, the L2TP tunnel is specified as a point to point relationship. I have found however, that it is particularly advantageous to establish a PPP session with a first call ID 1 on one L2TP tunnel and another PPP session with a second call ID 2 on another L2TP tunnel. This has the advantage that translating from call ID 1 to call ID 2 and forwarding the whole PPP session is very similar to the label translation function required of MPLS and can be implemented on the same hardware. As illustrated in FIG. 5 and in FIGS. 5a to 5c, it is possible to perform PPP session switching at each node in the IP Layer 2 network. However, if this leads to more switching stages than are required, then it is possible to bypass layer 2 nodes using MPLS tunnels. The PPP session is the basic method of providing a secure IP relationship between two users as PPP provides a toolkit of authentication and encryption capabilities. PPP is used in emerging xDSL systems as the means of achieving secure IP services. A PPP session switching layer network is therefore a flexible means of providing a secure IP session network service.

Figure 5A:
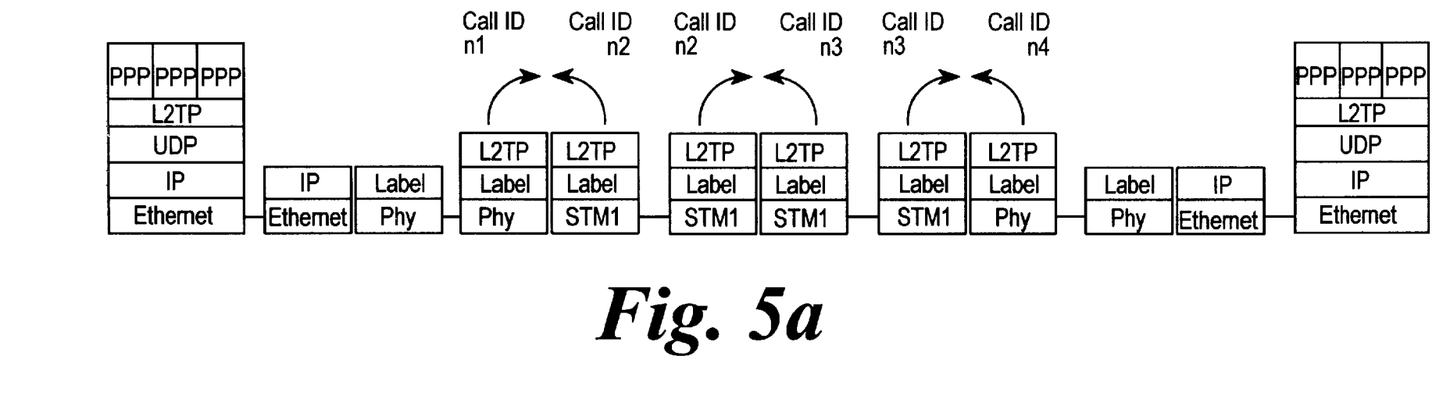
FIGS. 5a to 5c illustrate a number of methods for the connection or set up of an IP (PPP) session across the network of FIG. 5.
Figure 5B:
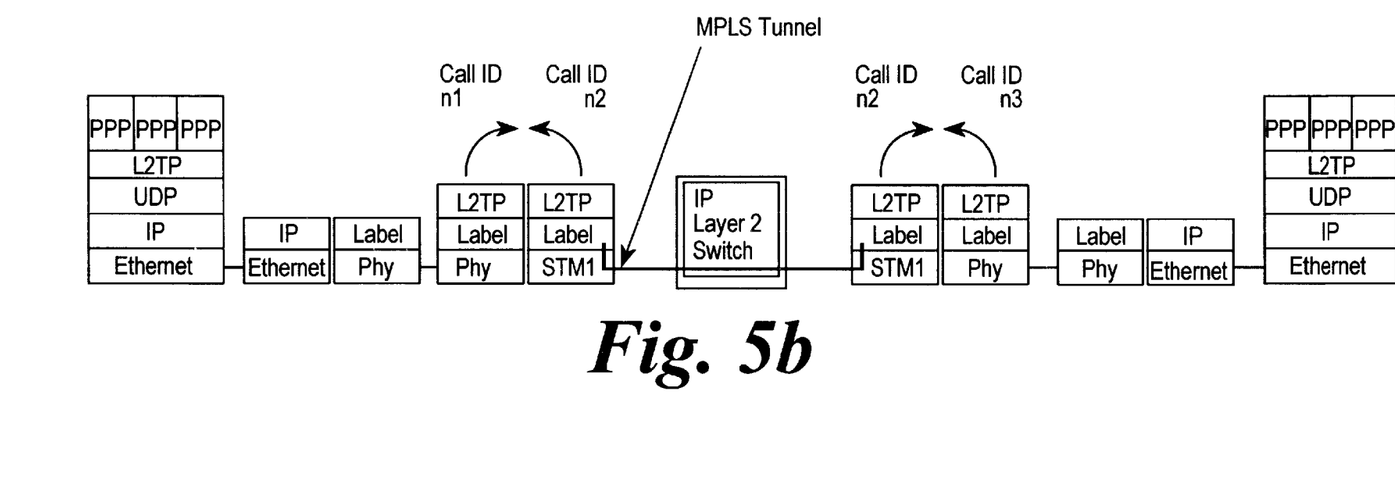
Figure 5C:
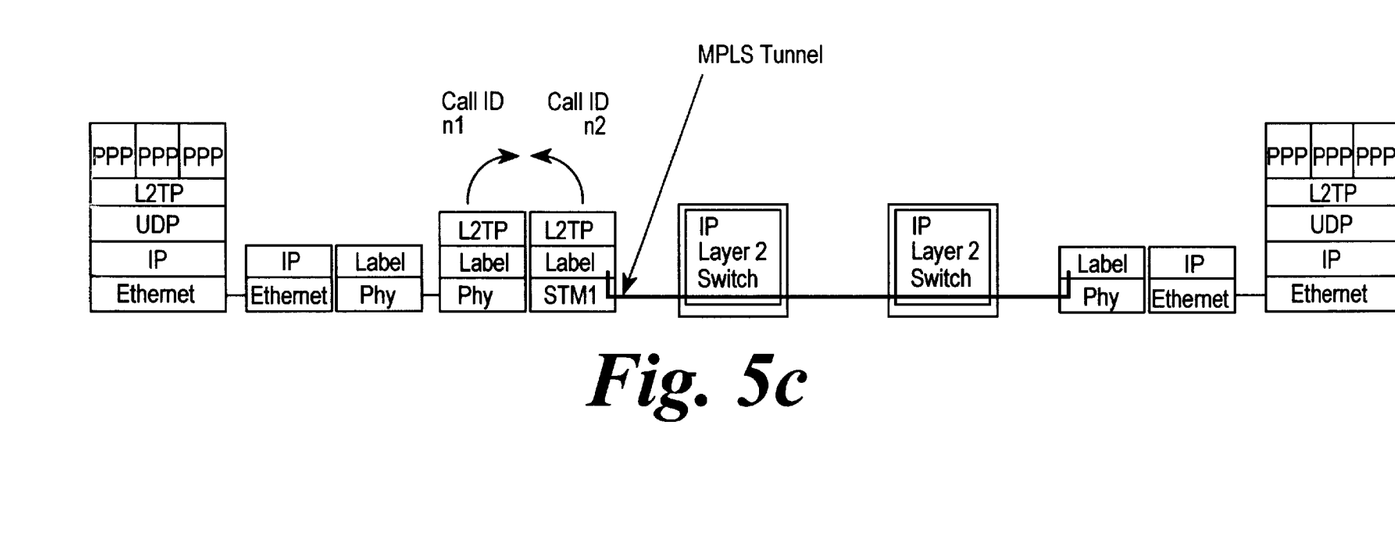

A number of mechanisms for providing and managing end-to-end connectivity in the arrangement of FIG. 5 are illustrated in FIG. 5a to 5c. FIG. 5a shows a workstation configured for L2TP operation connected over an Ethernet to an MPLS edge router. Communicating over three stages of IP Layer 2 switches configured as L2TP Tunnel switches to a further instance of an MPLS edge router connected by an Ethernet to a workstation configured for L2TP operation. A PPP session on one workstation is connected to a PPP session in the other workstation via the three tunnel switches. Each of the labels identifies an L2TP tunnel endpoint at which L2TP tunnel processing takes place. At each stage of switching the PPP session is identified by an Ingress Tunnel id/Call id—Egress Tunnel id/Call id tuple. This is stored in the IP Layer 2 switch and is used to reconstruct the L2TP headers of the packets relating to this PPP session as they pass from switch to switch along the connection in accordance with the switch operation described above. In FIG. 5b one stage of L2TP Tunnel switching has been eliminated and an engineering tunnel is used to transit an MPLS configured Layer 2 switch as described above. Similarly in FIG. 5c the engineering tunnel is extended over two stages of MPLS switching.

Figure 6:
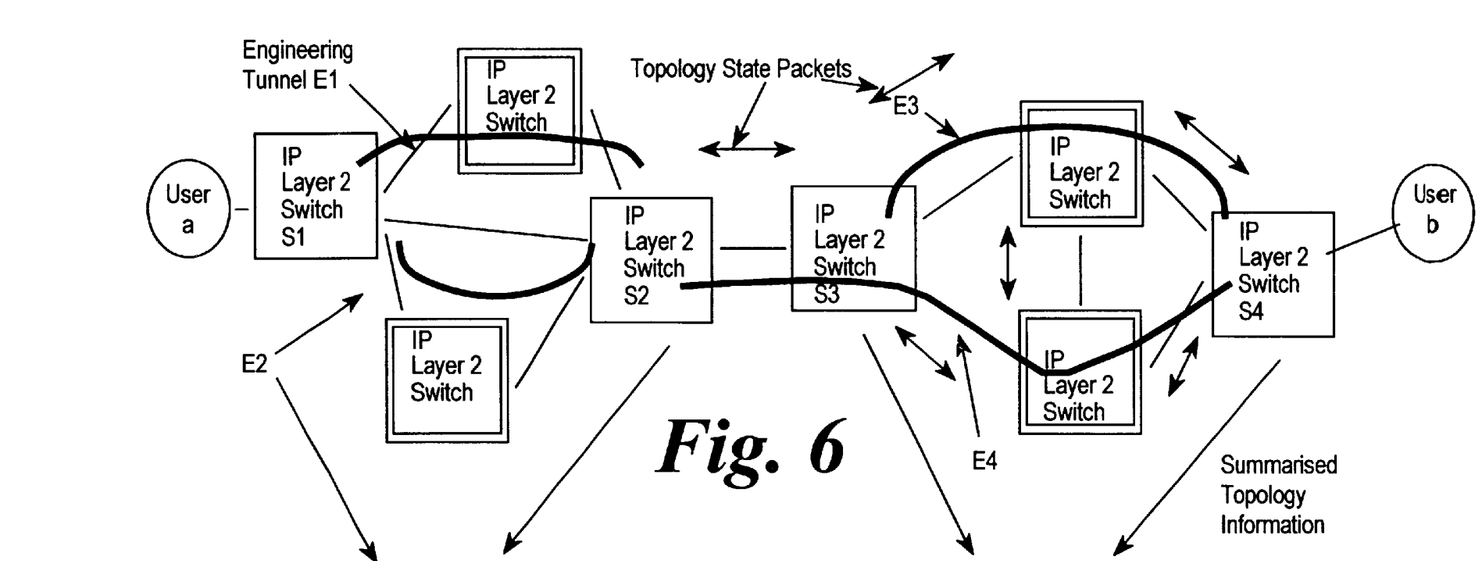
FIGS. 6 and 6a together illustrates the way in which topology information is communicated and summarised within the network of FIG. 5.
Figure 6A:
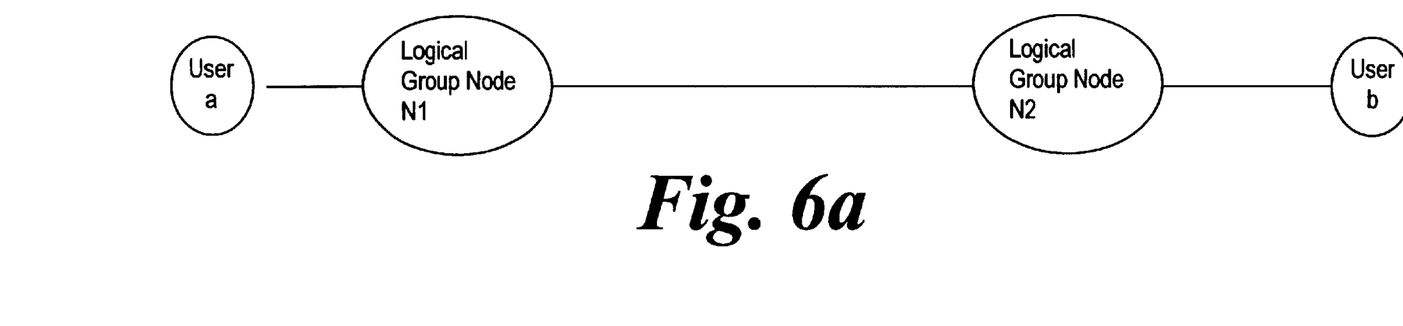

Some principles of the control architecture of the arrangement of FIG. 4 are illustrated in FIG. 6 and in the associated image network diagram of FIG. 6a. In the arrangement of FIG. 6, IP layer 2 switch nodes 61 each exchange topology state packets (TSP) with their neighbours. This allows each node 61 to establish a topology database of its own neighbourhood. The topology state packets are sent on a regular basis and contain for example information on available bandwidth. In a large network the amount of topology information may grow to the point where it becomes difficult or impossible to communicate this information to all nodes in a network. In the present arrangement, this problem is overcome by defining a hierarchy of sub-networks within the network. Within a sub-network each node maintains a full database of all topology information relating to the sub-network. For more distant nodes the sub-network is summarised as a logical group node as illustrated in FIG. 6a. Within a sub-network the nodes elect a peer group leader which is responsible for summarising the information and distributing it to other peer group leader nodes which then distribute the information within their sub-networks. Each node is thus able to formulate a view of the path that will be used on an end to end basis in order to reach a desired destination without requiring a detailed knowledge of remote parts of the network. This view of the end to end path is constructed as a designated transit list, which for the home sub-network is formulated as a list of real nodes, but for more distant sub-networks as a list of logical group nodes. As each sub-network is entered, the logical group node identity is expanded to a list of real nodes to be transited. This form of routing and connection control has been used in the prior art to control ATM networks. (ATM Forum: Private Network Node Interface (PNNI)).

Figure 7:
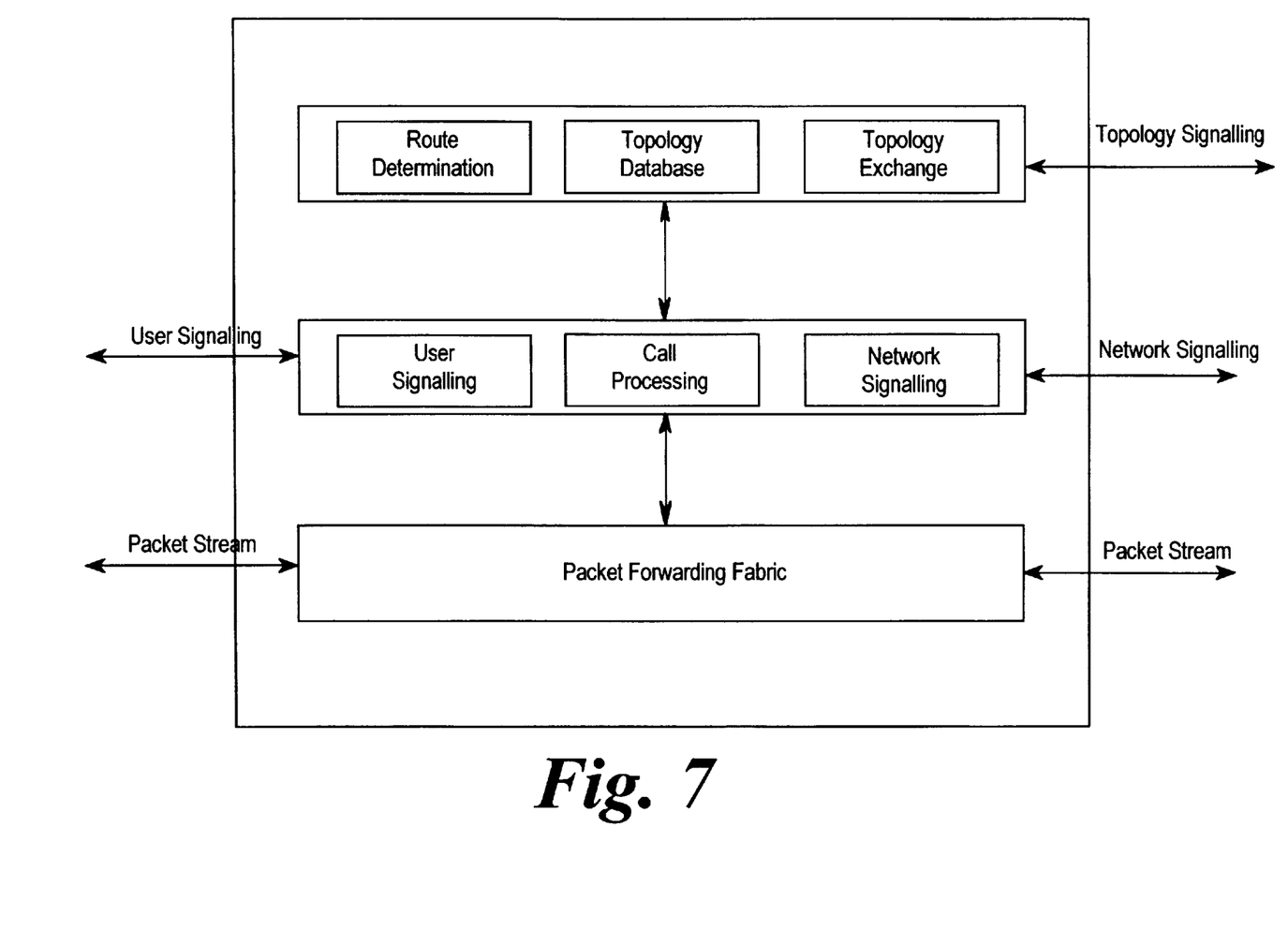
FIG. 7 shows a functional architecture of a node providing connection oriented services according to a preferred embodiment of the invention.

The functional architecture of a node of the arrangement of FIG. 6 for connection oriented services is illustrated schematically in FIG. 7. In FIG. 7, the topology signalling is based on the PNNI (Private Network-Network Interface) topology state packets, and the user signalling and network signalling are based on the L2TP signalling illustrated in FIG. 2.

Figure 8:
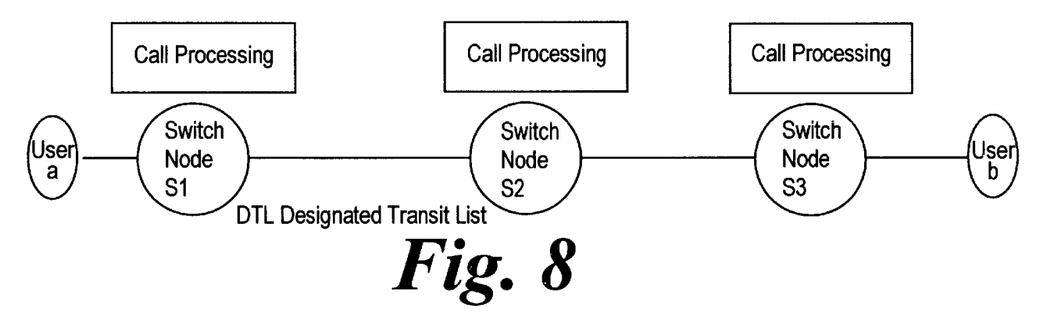
FIG. 8, and its associated flow chart of FIG. 8a, illustrates the establishment of an MPLS user tunnel having bandwidth guarantees.
Figure 8A:
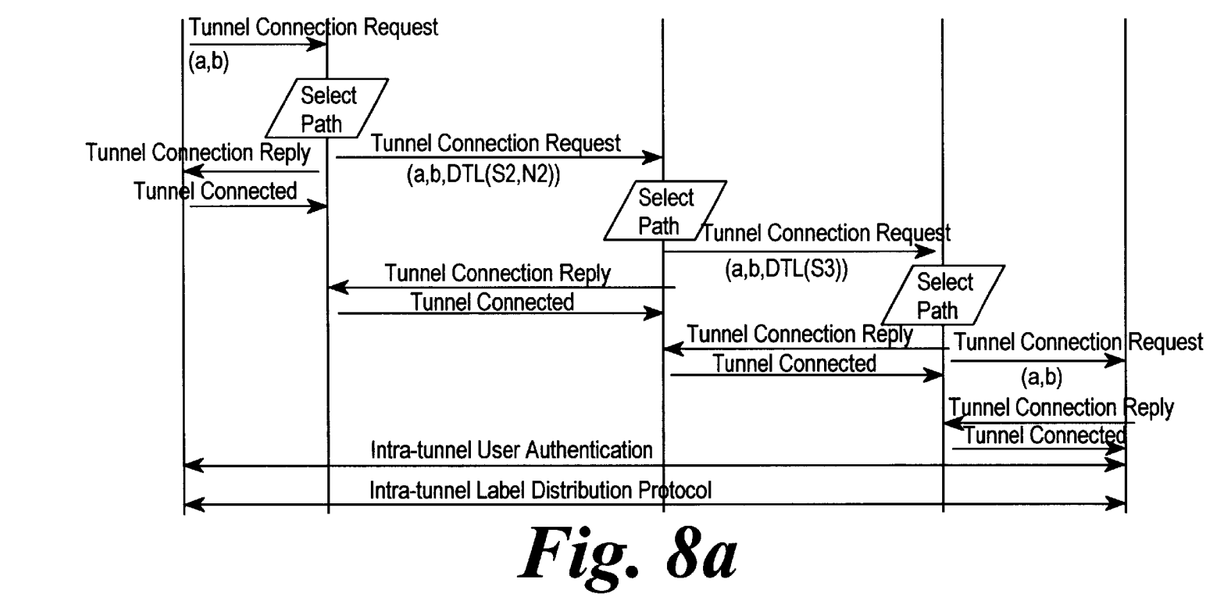

The establishment of an MPLS user tunnel in the arrangement of FIG. 6 is illustrated in FIG. 8 and in the associated flow chart of FIG. 8a. The two figures show the way in which a connection is made across the network configuration of FIG. 6. The host node 81 of user-A is switch node S1 which determines from its topology database that the user-B to whom a connection is to be established can be reached via switch node S2 and logical group node N2. The switch node S1 therefore forwards the tunnel connection request with a designated transit list of S2, N2. Switch node S2 has an engineering tunnel established directly to the host switch 83 of user-B. Assuming that this engineering tunnel has available capacity, then it is selected and the connection to the destination is established via a user tunnel set up within the engineering tunnel. At each switch node along the user tunnel path, a connection admission control (CAC) function is performed to determine how to route the connection or indeed whether the connection can be accepted. If the user tunnels are treated as differentiated services aggregates, then they will be policed for conformance with their respective service level agreement (SLA) at the entry to the network. The use of the connection admission control function at each node further guarantees that the service level agreement will be maintained across the entire network. The action of making the connection is to set the treatment indicators in the packet forwarding fabric such that the label processing functions behave as illustrated in FIG. 2.

Figure 9:
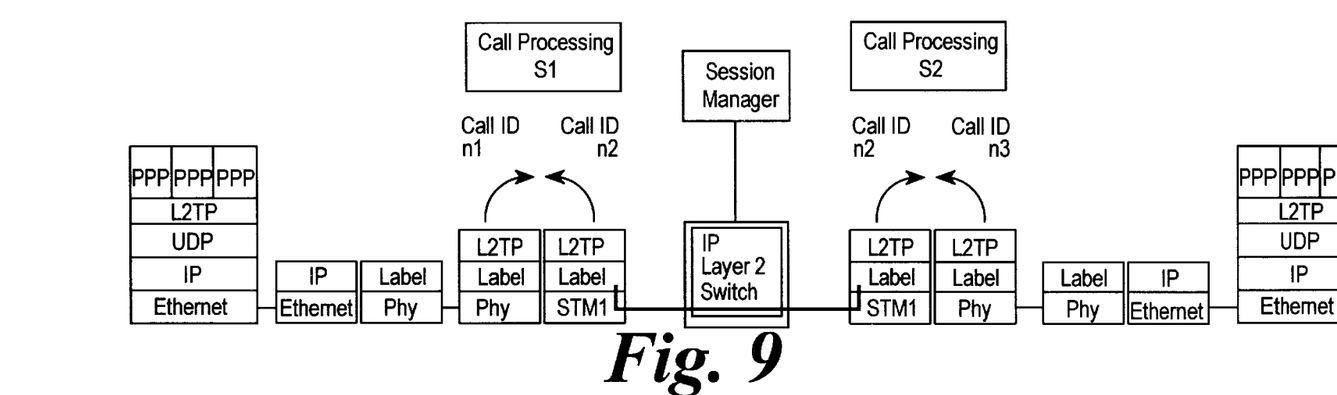
FIG. 9, and its associated flow chart of FIG. 9a, illustrates the establishment of an end-to-end IP (PPP) session having bandwidth guarantees and enabling the end-to-end operation of standard IP authentication and encryption protocols.
Figure 9A:
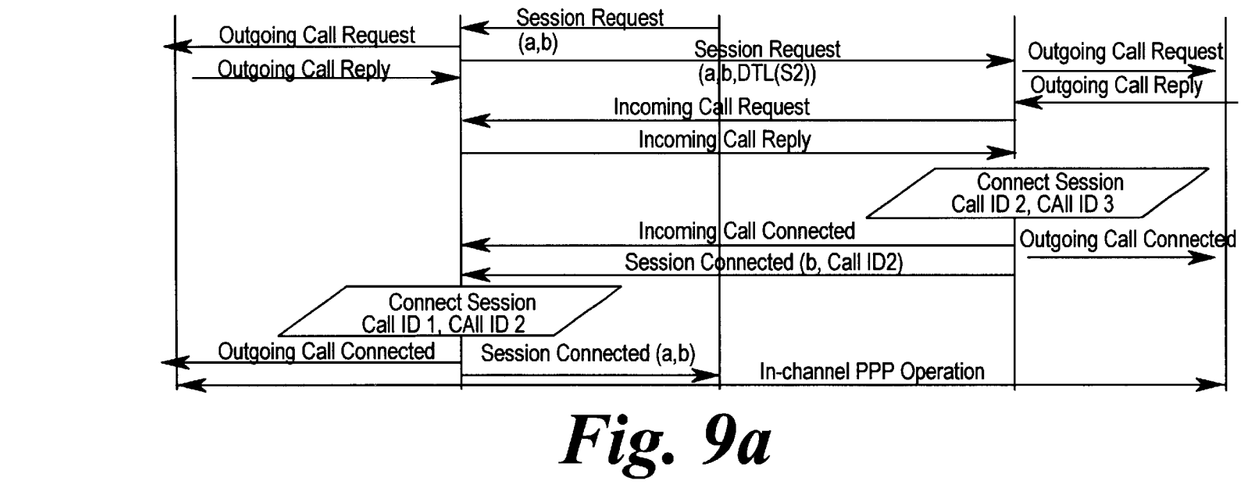

The establishment of an end to end PPP Session is illustrated in FIG. 9 and in the associated flow chart of FIG. 9a, and corresponds to the mechanism of FIG. 5b. In this case it is assumed that a session manager requests the PPP session. This could be as a result of some action by one of the users; e.g. one user could have requested to purchase an item from a server on the World Wide Web which led to the request for a secure IP session to the sales office. The signalling in this case is at two levels, that related to the session request which is passed between call processing functions embedded in the switches, and that related to the PPP call which is passed in band to the L2TP control entities in each node. The layer 2 protocol (L2TP) entities create a PPP call in each L2TP tunnel and the call processing function primes the call ID translation in each node which allows the packet forwarding fabric to modify the L2TP header before forwarding it on the next L2TP tunnel.

It will be understood that the above description of a preferred embodiment is given by way of example only and that various modifications may be made by those skilled in the art without departing from the spirit and scope of the invention.

What is claimed is:

1. A method of switching connection oriented services over a connectionless network, the method comprising establishing engineering tunnels in the connectionless network, establishing user tunnels within the engineering tunnels, and transporting said connection oriented services via said user tunnels, wherein management of said connection oriented services is performed by the transmission of signalling information via said engineering tunnels, wherein said tunnels comprise MPLS or L2TP tunnels, and wherein said connection oriented services are provided with an indication of the tunnel protocol containing those services, wherein said network comprises a hierarchy of sub-networks each incorporating a plurality of nodes comprising IP Layer 2 switches, and wherein, within each said sub-network, each node has a first database of topology information relating to that sub-network, and a second database of summary information relating to other sub-networks, said other sub-networks being listed in the second database as logical group nodes, and wherein, to establish an end to end connection between first and second users, a first host node of the first user determines from its first and second databases a logical node containing a second host node of the second user, forwarding in an engineering tunnel via a plurality of intermediate nodes a connection request to that second host node, establishing the connection within a user tunnel contained in the engineering tunnel, and, at each intermediate node, providing a connection admission control so as to guarantee that, for an accepted connection, a predetermined level of service is maintained for that connection.

2. A method as claimed in claim 1, wherein, within each said sub-network, one node is defined as a peer group leader for that sub-network, and wherein said summary information is distributed to the nodes of that sub-network from the peer group leader.

3. A method as claimed in claim 2, and further comprising establishing a point to point protocol (PPP) session using a first call identifier on a first tunnel and a second call identifier on a second tunnel, and providing a translation from the first call identifier to the second call identifier whereby to set up a continuous end to end path.

4. A connectionless network arrangement for switching connection oriented services, the network arrangement comprising means for establishing engineering tunnels in the connectionless network, means for establishing user tunnels within the engineering tunnels, and means for transporting said connection oriented services via said user tunnels, wherein management of said connection oriented services is performed by the transmission of signalling information via said engineering tunnels, wherein said tunnels comprise MPLS or L2TP tunnels, and wherein said connection oriented services are provided with an indication of the tunnel protocol containing those services, wherein said network comprises a hierarchy of sub-networks each incorporating a plurality of nodes comprising IP Layer 2 switches, and wherein, within each said sub-network, each node has a first database of topology information relating to that sub-network, and a second database of summary information relating to other sub-networks, said other sub-networks being listed in the second database as logical group nodes, and wherein, to establish an end to end connection between first and second users, a first host node of the first user determines from its first and second databases a logical node containing a second host node of the second user, forwarding in an engineering tunnel via a plurality of intermediate nodes a connection request to that second host node, establishing the connection within a user tunnel contained in the engineering tunnel, and, at each intermediate node, providing a connection admission control so as to guarantee that, for an accepted connection, a predetermined level of service is maintained for that connection.

5. An arrangement as claimed in claim 4, wherein, within each said sub-network, one node is defined as a peer group leader for that sub-network, and wherein said summary information is distributed to the nodes of that sub-network from the peer group leader.

6. An arrangement as claimed in claim 5, and further comprising means for establishing a point to point protocol (PPP) session using a first call identifier on a first tunnel and a second call identifier on a second tunnel, and means for providing a translation from the first call identifier to the second call identifier whereby to set up a continuous end to end path.

* * * * *